United States Patent
Barabash et al.

(10) Patent No.: US 9,407,541 B2
(45) Date of Patent: Aug. 2, 2016

(54) PROPAGATING A FLOW POLICY BY CONTROL PACKET IN A SOFTWARE DEFINED NETWORK (SDN) BASED NETWORK

(71) Applicant: International Business Machines Corporation, Armonk, NY (US)

(72) Inventors: Katherine Barabash, Haifa (IL); Yaniv Ben-Itzhak, Kiryat-yam (IL); Rami Cohen, Haifa (IL)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 14/260,305

(22) Filed: Apr. 24, 2014

(65) Prior Publication Data
US 2015/0312142 A1 Oct. 29, 2015

(51) Int. Cl.
 H04L 12/00 (2006.01)
 H04L 12/721 (2013.01)
 H04L 12/717 (2013.01)
 H04L 12/725 (2013.01)

(52) U.S. Cl.
 CPC .............. H04L 45/38 (2013.01); H04L 45/42 (2013.01); H04L 45/306 (2013.01)

(58) Field of Classification Search
 CPC ...................................................... H04L 45/42
 See application file for complete search history.

(56) References Cited

U.S. PATENT DOCUMENTS

| 8,521,905 B2 | 8/2013 | Beliveau et al. | |
|---|---|---|---|
| 2013/0010803 A1 | 1/2013 | Yamaguchi | |
| 2013/0124707 A1 | 5/2013 | Ananthapadmanabha et al. | |
| 2013/0212245 A1 | 8/2013 | Koponen et al. | |
| 2013/0219037 A1 | 8/2013 | Thakkar et al. | |
| 2013/0329601 A1* | 12/2013 | Yin | H04L 45/02 370/254 |
| 2014/0022911 A1* | 1/2014 | Sandick | H04L 43/0811 370/242 |
| 2014/0098669 A1* | 4/2014 | Garg | H04L 45/38 370/235 |
| 2015/0244605 A1* | 8/2015 | Grandi | H04L 45/026 370/248 |
| 2015/0280927 A1* | 10/2015 | Liang | H04L 45/38 370/259 |

OTHER PUBLICATIONS

McKeon, N. et al., "OpenFlow: enabling innovation in campus networks," ACM SIGCOMM Computer Communication Review vol. 38, No. 2, pp. 69-74, 2008.
Reitblatt, M. et al., "Consistent updates for software-defined networks: Change you can believe in!," In Proc.of 10th ACM Workshop on Hot Topics in Networks, ACM, 2011, 6 p.
Foster, N. et al., "Frenetic: A network programming language," In ACM SIGPLAN Notices vol. 46, No. 9, pp. 279-291, ACM, 2011.
Canini, M. et al. "A Nice way to test OpenFlow applications," In Proc. 9th USENIX Sym. on Networked Systems Design and Implementation, NSDI '12, Apr. 25-27, 2012, 14 p.
Voellmy, A. et al., "Scalable Software Defined Network Controllers," In Proc. of ACM SIGCOMM 2012 Conf. on Applications, Technologies, Architectures, and Protocols for Computer Communications, ACM, 2012, 2 p.

(Continued)

*Primary Examiner* — John Blanton (57) ABSTRACT

Propagating a flow policy within a software defined network (SDN) includes sending a route path request for a flow from a first forwarding node to an SDN controller of the SDN, receiving route path information specifying a route path for the flow from the SDN controller, and generating, using a processor of the first forwarding node, a control packet including the route path. The control packet is communicated from the first forwarding node to a second forwarding node.

17 Claims, 4 Drawing Sheets

(56) References Cited

OTHER PUBLICATIONS

Voellmy, A. et al., "Scaling Software-Defined Network Controllers on Multicore Servers," Yale Univ. Dept. of Computer Science, Jul. 2012, 22 p.

Huang, D. et al., "High-Fidelity Switch Models for Software-Defined Network Emulation," In Proc. of 2nd ACM SIGCOMM Workshop on Hot Topics in Software Defined Networking, pp. 43-48, acm, 2013.

* cited by examiner

| Ethernet Header | IP Header | | Transport Header | | Payload | | | | |
|---|---|---|---|---|---|---|---|---|---|
| | Src IP | Dst IP | Src Port | Dst Port | Start IP | 1st Hop | 2nd Hop | 3rd Hop | End IP |
| | $IP_1$ | $IP_2$ | 5077 | 40 | $IP_{start}$ | $IP_1$ | $IP_2$ | $IP_n$ | $IP_{end}$ |

FIG. 4A 150-2

| Ethernet Header | IP Header | | Transport Header | | Payload | | | | |
|---|---|---|---|---|---|---|---|---|---|
| | Src IP | Dst IP | Src Port | Dst Port | Start IP | 1st Hop | 2nd Hop | 3rd Hop | End IP |
| | $IP_2$ | $IP_3$ | 5077 | 40 | $IP_{start}$ | $IP_1$ | $IP_2$ | $IP_3$ | $IP_{end}$ |

PROPAGATING A FLOW POLICY BY CONTROL PACKET IN A SOFTWARE DEFINED NETWORK (SDN) BASED NETWORK

BACKGROUND

A software-defined network (SDN) is an adaptable architecture for a network in which data routing decisions are decoupled from the particular network nodes that perform the data transfers. The network nodes of the SDN responsible for making decisions about data routing form the "control plane." The network nodes of the SDN responsible for forwarding the data form the "data plane." An abstraction layer is typically included through which the SDN may be administered. The abstraction layer hides lower level functionality and details of the underlying network infrastructure. As such, SDNs are highly adaptable. For example, a network administrator may directly program aspects of the SDN including, but not limited to, network control, network configuration, and otherwise centrally manage the SDN.

An SDN controller is the network node tasked with determining a route path for data packets of a "flow." The SDN controller is part of the control plane of the SDN. The route path determined by the SDN controller specifies the particular network nodes and ordering of such network nodes through which data packets of a given flow will pass when communicated from a start node to an end node of the flow. The SDN controller is tasked with communicating the route path for the flow to each of the network nodes of the route path. As such, control information is kept within the control plane as a series of communications that occur between the SDN controller and each network node of the route path for the flow. Responsive to receiving route path information for a flow from the SDN controller, each recipient network node updates an internal flow table with the instructions received from the SDN controller. The instructions specify how the recipient network nodes are to process data packets belonging to the flow.

When the start node receives instructions from the controller, the start node begins sending data packets of the flow over the data plane of the SDN to the next network node specified in the route path. In general, control plane communications refer to the exchange of control information between the SDN controller and a data forwarding node, between the SDN controller and a start node, or between the SDN controller and the end node. Data plane communications refer to the exchange of data for a flow between start node and a forwarding node, between two forwarding nodes, or between a forwarding node and the end node.

In some cases, data packets of the flow may be received by a network node, e.g., a forwarding node, prior to that network node receiving instructions from the SDN controller indicating how to process the data packets. Any of a variety of different errors and/or delays may occur in such a situation including, for example, data packets arriving at the end node out of order. The SDN architecture does not guarantee consistent handling of data packets belonging to a same flow.

SUMMARY

In one aspect, a method includes receiving, from a first forwarding node of a software defined network (SDN), a route path request for a flow and, responsive to the route path request, determining route path information specifying a route path for the flow using a processor of an SDN controller. The method further includes communicating the route path information from the SDN controller only to the first forwarding node.

In another aspect, a method includes sending a route path request for a flow from a first forwarding node to an SDN controller of an SDN, receiving route path information specifying a route path for the flow from the SDN controller, and generating, using a processor of the first forwarding node, a control packet specifying the route path. The method further includes communicating the control packet from the first forwarding node to a second forwarding node.

In another aspect, a system includes a processor programmed to initiate executable operations. The executable operations include sending a route path request for a flow from a first forwarding node to an SDN controller of an SDN, receiving route path information specifying a route path for the flow from the SDN controller, and generating a control packet specifying the route path. The executable operations also include communicating the control packet from the first forwarding node to a second forwarding node.

In still another aspect, a computer program product includes a computer readable storage medium having program code stored thereon. The program code is executable by a processor to perform a method. The method includes sending a route path request for a flow from a first forwarding node to an SDN controller of an SDN using a processor of the first forwarding node, receiving route path information specifying a route path for the flow from the SDN controller using the processor of the first forwarding node, and generating a control packet specifying the route path using the processor of the first forwarding node. The method further includes communicating the control packet from the first forwarding node to a second forwarding node using the processor of the first forwarding node.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to software defined networks (SDNs) and, more particularly, to propagating a flow policy within an SDN. In accordance with the inventive arrangements disclosed herein, a flow policy is propagated and/or established using a control packet. A start node begins a flow directed to an end node. In doing so, the start node initiates the flow by communicating with a network node, referred to as a forwarding node, of the SDN. The forwarding node, in turn, sends a route path request for the flow to an SDN controller. The SDN controller determines a route path for the flow and sends the route path to the forwarding node. The forwarding node generates a control packet including the route path and communicates the control packet to a next forwarding node specified by the route path. The control packet, which includes and/or specifies the route path, is communicated from the forwarding node along the route path through the data plane of the SDN to each of the other forwarding nodes specified by the route path. Each forwarding node that receives the control packet updates the flow table stored therein in accordance the received control packet.

The forwarding node sends the control packet to the next forwarding node prior to sending any other data packet of the flow, e.g., data packets. Accordingly, each of the forwarding nodes of the route path is able to update the flow table stored therein with instructions dictating how to process received data packets for the flow. The instructions are guaranteed to be received by the various forwarding nodes of the route path prior to any data packets of the flow. As such, per-flow consistency is guaranteed and out of order data packets for the flow are avoided. Further details are described below with reference to the drawings.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
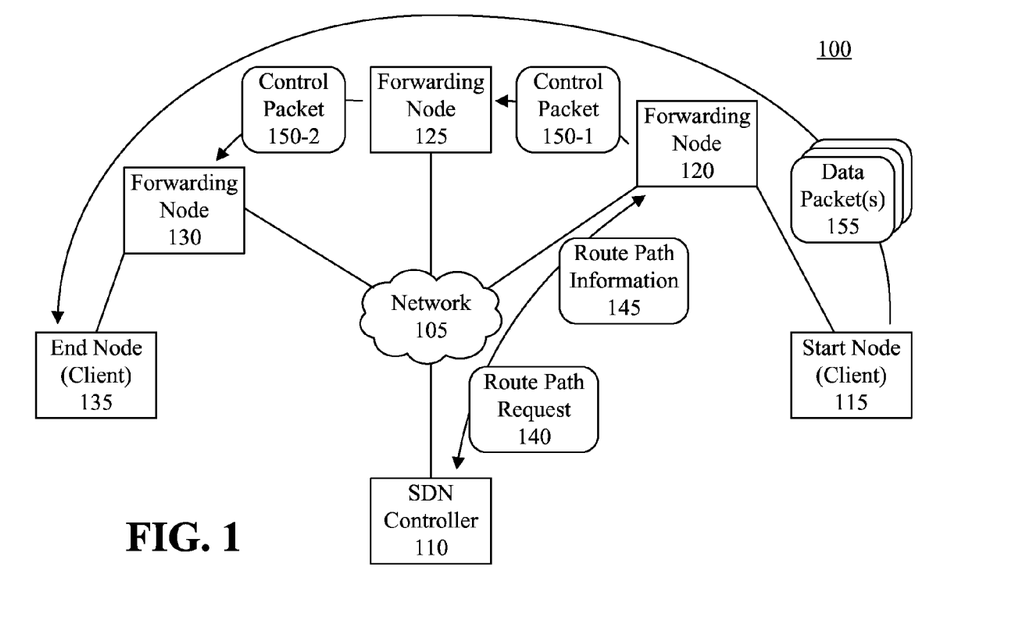
FIG. 1 is a block diagram illustrating an example of a communication system.

FIG. 1 is a block diagram illustrating an exemplary communication system 100. Communication system 100 is a networked system. In one aspect, communication system 100 is implemented as an SDN. Communication system 100 includes a plurality of network nodes communicatively linked by a network 105. The network nodes include an SDN controller 110, a start node 115, forwarding nodes 120, 125, and 130, and an end node 135.

Network 105 is the medium used to provide communication links between the various network nodes connected together within communication system 100. Network 105 may include connections, such as wire, wireless communication links, or fiber optic cables. Network 105 may be implemented as, or include, any of a variety of different communication technologies such as a Wide Area Network (WAN), a Local Area Network (LAN), a wireless network, a mobile network, a Virtual Private Network (VPN), the Internet, the Public Switched Telephone Network (PSTN), or the like.

In general, each network node may represent a data processing system such as a switch, a router, a computer, or the like. SDN controller 110, for example, may be implemented as a server. Start node 115 and end node 135 may be implemented as computing systems, mobile computing and/or communication systems, or the like. For example, start node 115 and end node 135 each may be implemented as a client system that communicate using a flow. Forwarding nodes 120, 125, and 130 each may be implemented as a switch, a router, a server, or the like. In one aspect, one or more of start node 115, end node 135, or forwarding nodes 120, 125, and/or 130 may be implemented as virtual machines executing within a host data processing system or two or more different host data processing systems. Any network node that is part of a route path and not an SDN controller, not a start node that initiates a flow, and not an end node that is the endpoint of the flow is considered a forwarding node.

For purposes of discussion and illustration, start node 115 is communicatively linked to forwarding node 120. Similarly, end node 135 is communicatively linked to forwarding node 130. In this regard, forwarding node 120 provides start node 115 with access to network 105. Similarly, forwarding node 130 provides end node 135 with access to network 105.

In operation, start node 115, e.g., a client system, initiates a flow to end node 135. In general, a "flow" is a conversation and/or exchange of data between two endpoints such as start node 115 and end node 135. Each pair of endpoints may be engaged in one or more different and active flows. As defined within this disclosure, a "flow" means one or more packets having a same flow identifier. The flow identifier typically is specified in a header portion of a packet by the communicating endpoints. The particular data items used to form the flow identifier may vary across devices, network technologies, according to desired granularity, and/or the like. In illustration, a flow identifier having coarse granularity may utilize an address of the sender and an address of the receiver. For example, the flow identifier may be a combination of the Internet Protocol (IP) address for start node 115 and the IP address for end node 135. In another illustration, a flow identifier with finer granularity may include more than one header such as a TCP/IP 5-tupple including the MAC addresses of the start and end nodes, the source and endpoint IP addresses, protocol used, and port information.

Start node 115 initiates a flow directed to end node 135 by communicating with forwarding node 120. For example, start node 115 communicates one or more of data packets 155 to forwarding node 120. Responsive to start node 115 initiating the flow, forwarding node 120 communicates a route path request 140 for the flow to SDN controller 110. Route path request 140 specifies start node 115 and end node 135. In addition, route path request 140 may include one or more other attributes.

In one aspect, communication system 100 and, more particularly, the SDN, may provide additional services beyond delivery of packets from start node 115 to end node 135. These additional, or more advanced, services may include, but are not limited to, Quality of Service (QoS), resiliency, security, multipath, other policy attributes and/or the like. These advanced services may be implemented within, or by, SDN controller 105 and/or forwarding nodes 120, 125, and/or 130. Start node 115, in initiating the flow with forwarding node 120, may request one or more of such services to be used for the flow. Accordingly, forwarding node 120 may include within route path request 140 one or more attributes indicating the particular services to be used for the flow as requested by start node 115.

SDN controller 110, responsive to receiving route path request 140, determines route path information 145 for the flow. Route path information 145 includes a route path. The route path specifies an ordered set of one or more network nodes, that each data packet of the flow will travel in moving from start node 115 to end node 135. More particularly, SDN controller 110 determines one or more forwarding nodes, i.e., an ordered set of forwarding nodes, through which data packets 155 of the flow will travel in order to move from start node 115 to end node 135. In this example, a route path included in route path information 145 specifies start node 115, forwarding node 120, forwarding node 125, and forwarding node 130 leading to end node 135. SDN controller 110 sends route path information 145 to forwarding node 120. Thus, in this example, route path information 145 specifies that the flow will travel from start node 115 to forwarding node 120, to forwarding node 125, to forwarding node 130, and on to end node 135.

In another aspect, SDN controller 110 may determine any services specified by route path request 140. In that case, SDN controller 110 includes any attributes and/or instructions within route path information 145 that are needed to direct forwarding nodes 120, 125, and 130 of the route path to implement the requested services. As such, if supported, route path information 145 may specify the advanced services to be used by forwarding nodes 120, 125, and/or 130 in processing the flow. For example, route path information 145 may include instructions for forwarding nodes to perform operations such as rewriting, modifying, and/or augmenting data packet headers to specify fields that may be consumed or used by one or more other forwarding nodes of the route path, matching instructions to be performed against the fields in the data packet headers for forwarding nodes of the route path, instructions for updating internal flow tables of the forwarding nodes of the route path, and/or the like.

Unlike conventional SDN architectures, SDN controller 110 does not communicate route path information 145 relating to the flow initiated by start node 115 to any forwarding node other than forwarding node 120. For example, SDN controller 110 does not communicate route path information 145 to forwarding node 125 or to forwarding node 130 when setting up the flow. Similarly, SDN controller 110 does not communicate route path information 145 to start node 115 or to end node 135. As illustrated in FIG. 1, SDN controller 110 only provides route path information 145 to the particular network node that issued route path request 140, which is forwarding node 120 in this example. In some cases, however, SDN controller 110 may communicate with a particular type of network node that is capable of modifying the route path as will be described in further detail within this specification.

Forwarding node 120, responsive to receiving route path 145 from SDN controller 110, generates control packet 150-1. Control packet 150-1 includes, or specifies, at least a portion of route path information 145 or a derivative or modification thereof. For example, control packet 150-1 may specify the route path, i.e., the ordered set of forwarding nodes, any attributes for advanced services to be performed, instructions for updating flow tables, instructions for processing packets and/or header information as previously described, etc. In one aspect, control packet 150-1 includes route path information 145 within a payload portion of control packet 150-1. In another aspect, control packet 150-1 includes route path information 145 in an encapsulated form allowing each forwarding node to read and/or remove needed information from the control packet and/or remove an encapsulation layer prior to sending the control packet, or a modified version thereof, to a next network node of the route path.

Forwarding node 120 updates an internally stored flow table according to route path information 145 so that other packets of the flow will be sent to the next node in the route path. In this example, the next node of the route path is forwarding node 125. Forwarding node 120 further communicates control packet 150-1 to forwarding node 125. Forwarding node 125 evaluates control packet 150-1 and updates an internally stored flow table based upon the route path information 145 specified by control packet 150-1. Forwarding node 125, as a result of updating the internally stored flow table, is configured to forward packets of the flow to the next network node of the route path, which is forwarding node 130. Forwarding node 125 updates and/or modifies control packet 150-1, thereby generating control packet 150-2. Forwarding node 125 communicates, or forwards, control packet 150-2 to forwarding node 130. As noted, in one aspect, only the residual or remaining nodes of the route path may be included or specified by control packet 150-2 as opposed to portions of the route path already traversed such as start node 115 and/or forwarding node 120.

Forwarding node 130 evaluates control packet 150-2 and updates an internally stored flow table based upon the received route path specified by control packet 150-2. Forwarding node 130 determines that no further forwarding nodes are specified for the route path and, as such, does not send a control packet to end node 135. Forwarding node 130, however, is programmed, or configured, to send data packets 155 of the flow to end node 135.

Subsequent to forwarding node 120 sending control packet 150-1 to forwarding node 125, forwarding node 120 may begin sending one or more of data packets 155 of the flow as received from start node 115. Data packets 155 of the flow, however, are not sent by forwarding node 120 until after control packet 150-1 is sent. As described in further detail within this disclosure, control packet 150-1 is sent over the data plane of the SDN. Sending control packet 150-1 over the data plane prior to sending any data packets of the flow ensures that consistency in application of any policy for data packets 155 of the flow is observed. In particular, control packets propagate through the forwarding nodes preceding any data packets of the flow. As illustrated in FIG. 1, data packets 155 are sent from start node 115 to end node 135 via the established route path.

Thus, data packets 155 travel from start node 115, to forwarding node 120, to forwarding node 125, to forwarding node 130, through to end node 135. Each of forwarding nodes 120, 125, and 130 processes data packets 155 in accordance with the particular instructions for the flow corresponding to that forwarding node as specified by received route path information 145. Forwarding node 120 receives route path information 145 directly from SDN controller 110. Forwarding node 125 receives route path information 145 from forwarding node 120 via control packet 150-1. Forwarding node 130 receives route path information 145 from forwarding node 125 via control packet 150-2.

Communication system 100 is provided for purposes of illustration only. A communication system may include additional network nodes, whether switches, routers, data processing systems, virtual machines, or the like, or fewer of network nodes. Further, while the example of FIG. 1 has been described with the control packet including route path information, in another example, the control packet may also include actual data of the flow.

Figure 2:
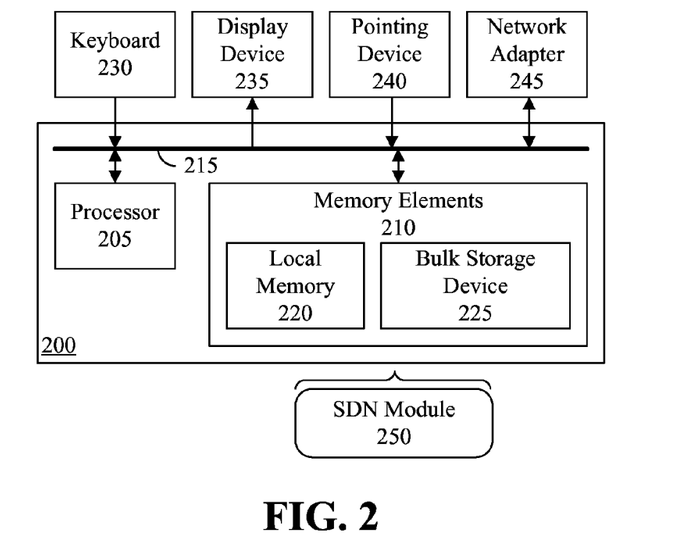
FIG. 2 is a block diagram illustrating an exemplary architecture for a network node.

FIG. 2 is a block diagram illustrating an exemplary architecture 200 for a network node. Architecture 200 may be used to implement any of a variety of different network nodes as described with reference to FIG. 1. For example, architecture 200 may be used to implement a router, a switch, a computer, including a client, a server, or the like. More particularly, architecture 200 illustrated in FIG. 2 may be used to implement SDN controller 110, start node 115, end node 135, or any of the various forwarding nodes described with reference to FIG. 1.

Architecture 200 includes at least one processor (e.g., a central processing unit) 205 coupled to memory elements 210 through a system bus 215 or other suitable circuitry. As such, a network node having architecture 200 can store program code within memory elements 210. Processor 205 executes the program code accessed from memory elements 210 via system bus 215 or the other suitable circuitry.

In one aspect, architecture 200 is implemented as a programmable data processing apparatus that is suitable for storing and/or executing program code. It should be appreciated, however, that architecture 200 can be used to implement any network node and/or system including a processor and memory that is capable of performing and/or initiating the functions and/or operations described within this disclosure. Further, architecture 200 can be used to implement a network node and/or system having any of a variety of different form factors.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 can be implemented as a hard disk drive (HDD), a solid state drive (SSD), or other persistent data storage device. Architecture 200 also can include one or more cache memories (not shown) that provide temporary storage of at least some program code in order to reduce the number of times program code must be retrieved from bulk storage device 225 during execution. It should be appreciated that memory elements 210 may include any of a variety of different computer readable storage media.

Input/output (I/O) devices such as a keyboard 230, a display device 235, and a pointing device 240 optionally can be coupled to architecture 200. The I/O devices can be coupled to architecture 200 either directly or through intervening I/O controllers. One or more network adapters 245 also can be coupled to architecture 200 to enable a network node using architecture 200 to become coupled to other network nodes such as other computer systems, remote printers, and/or remote storage devices through intervening private or public networks. Modems, cable modems, wireless transceivers, and Ethernet cards are examples of different types of network adapters 245 that can be used with architecture 200.

As pictured in FIG. 2, memory elements 210 can store an SDN module 250. SDN module 250, being implemented in the form of executable program code, is executed by a network node using architecture 200 and, as such, is considered an integrated part of any such system. In the case where architecture 200 is used to implement an SDN controller, SDN module 250 includes the program instructions that, when executed, cause the network node to perform the various operations described within this disclosure for an SDN controller. In the case where architecture 200 is used to implement a start node or an end node, e.g., a client, SDN module 250 includes the program instructions that when executed, cause the network node to perform the various operations described within this disclosure for a start node and/or an end node. In the case where architecture 200 is used to implement a forwarding node, SDN module 250 includes the program instructions that when executed, cause the network node to perform the various operations described within this disclosure for a forwarding node.

Forwarding nodes store a flow table (not shown) within memory elements 210. A forwarding node using architecture 200, under control of SDN module 250, updates the flow table in accordance with information specified within a received control packet from another forwarding node or in accordance with route path information received directly from the SDN controller as described within this disclosure. For example, an existing entry in the flow table corresponding to the flow may be updated or a new entry in the flow table for the flow may be created. It should be appreciated that SDN module 250, including any parameters and/or attributes utilized by SDN module 250 such as route path information, a control packet, and/or a flow table, are functional data structures that impart functionality when employed as part of a network node and/or system utilizing architecture 200.

Figure 3:
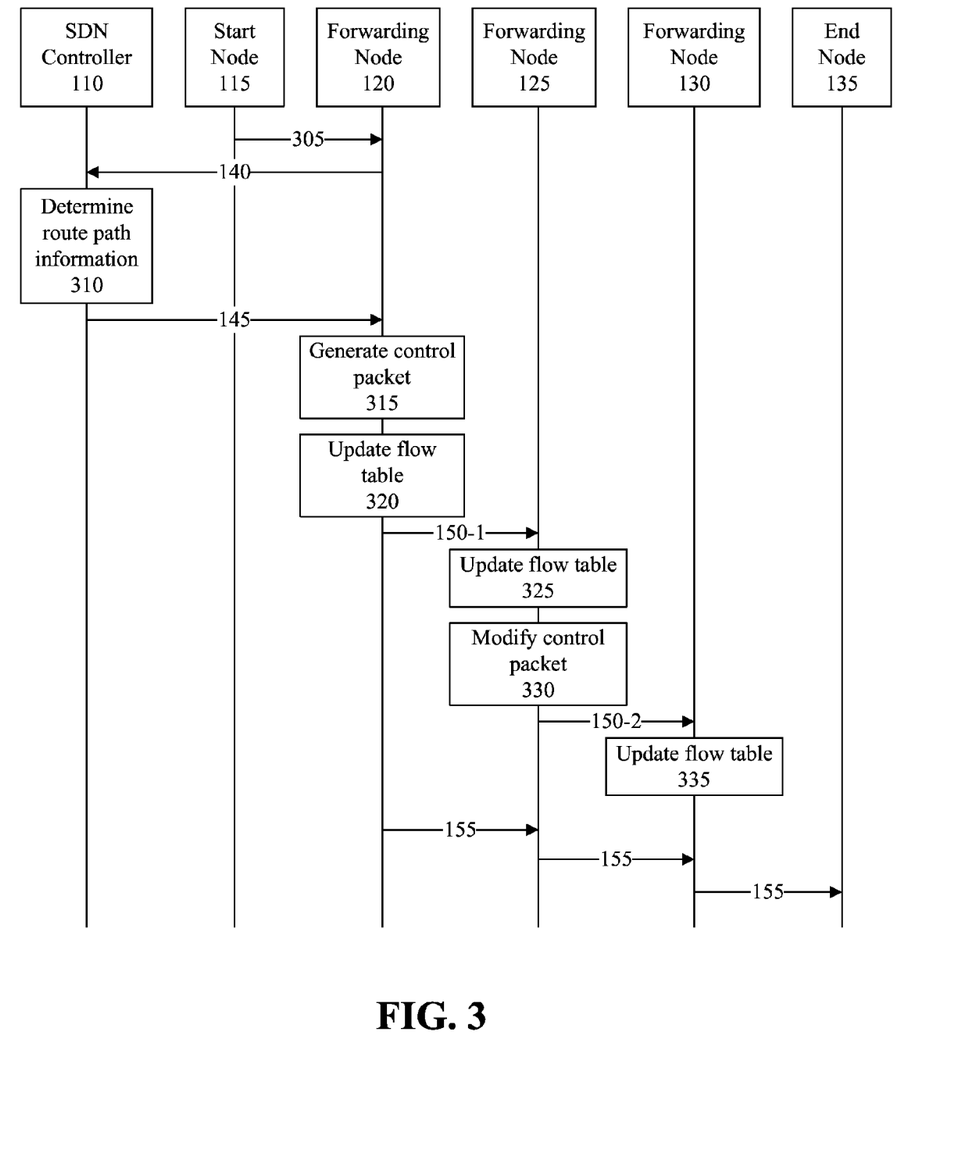
FIG. 3 is a message flow diagram illustrating an exemplary use of a control packet for establishing a route path for a flow according to a flow policy within a software defined network (SDN).

FIG. 3 is a message flow diagram illustrating an exemplary use of a control packet for establishing a route path for a flow according to a flow policy within an SDN. FIG. 3 illustrates messaging that occurs between network nodes of an SDN in establishing a flow and various operations performed by the network nodes. FIG. 3 begins in a state where start node 115 initiates a flow to end node 135 by sending communication 305 to forwarding node 120. In one aspect, communication 305 specifies start node 115, end node 135, and/or data packets 155. Communication 305 further may include attributes requesting one or more services for the flow. As discussed, forwarding node 120 may provide start node 115 with access to network communications.

Responsive to communication 305, forwarding node 120 sends route path request 140 for the flow to SDN controller 110. Routing path request 140 is sent over the control plane of the SDN. Route path request 140 specifies start node 115 and end node 135, e.g., IP addresses for the start and end nodes for the flow. Further, route path request 140 may include one or more attributes relating to the services to be applied to the flow as requested by start node 115.

SDN controller 110 receives route path request 140. Responsive to receiving route path request 140, SDN controller 110 determines route path information 145 for the flow in block 310. Route path information 145, as determined by SDN controller 110, includes or specifies start node 110, end node 135, one or more forwarding nodes such as forwarding nodes 120, 125, and 130, and an ordering of the network nodes forming the route path. As part of route path information 145, SDN controller 110 further may include one or more attributes and/or instructions for the flow. Attributes and/or instructions may be specified within route path information 145 on a per-forwarding node basis. SDN controller 110 sends route path 145 to forwarding node 120. SDN controller 110 sends route path information 145 over the control plane of the SDN directly to forwarding node 120.

Responsive to receiving route path information 145, forwarding node 120 generates control packet 150-1 in block 315. In general, forwarding node 120 sends control packet 150-1 along the route path determined by SDN controller 110. One or more control packets specifying route path information 145, or a derivative thereof, traverse the route path over the data plane of the SDN. In one aspect, control packets such as control packet 150-1 and/or 150-2 include the same header or header information that will be included in data packets 155 for the flow. As such, the decisions of any forwarding nodes of the route path having an ability to make a decision whether to pass a data packet 155 of the flow, block a data packet 155 of the flow, or divert a data packet 155 of the flow based upon header information may be observed in how the control packets are handled and/or processed.

In block 320, forwarding node 120 updates a flow table stored in memory therein. The flow table stored within forwarding node 120 is updated with any instructions included in route path 145 that indicate how forwarding node 120 is to process data packets 155 of the flow. As used herein, the phrases "updating the flow table," "update the flow table," or variants thereof, as performed by a forwarding node, refer to a process performed responsive to receiving a control packet and/or route path information 145. Updating means that the forwarding node searches for an entry in the flow table that matches the received control packet.

For example, the forwarding node determines a flow identifier from the received control packet or from received route path information 145. The forwarding node searches for an entry in the flow table having a matching flow identifier. If the forwarding node locates a matching entry, the forwarding node updates the matching entry with any instructions of the control packet for the forwarding node. The instructions dictate how the forwarding node handles, e.g., routes, data packets 155 for the flow. For example, such instructions dictate that forwarding node 120 is to forward data packets 155 to forwarding node 130 using any applicable services. If the forwarding node is unable to locate a matching entry, the forwarding node adds or creates an entry in the flow table that includes the instructions for the forwarding node as specified by the received control packet and/or route path information 145 for the flow.

With control packet 150-1 having been generated, forwarding node 120 communicates control packet 150-1 to a next network node of the route path. In this example, the next network node of the route path is forwarding node 125. Responsive to receiving control packet 150-1, forwarding node 125 performs one or more operations. In block 325, forwarding node 125 updates a flow table stored in memory therein as described with reference to forwarding node 120. The flow table stored within forwarding node 125 is updated with any instructions included in the route path of control packet 150-1 that indicate how forwarding node 125 is to process data packets 155 of the flow. For example, the flow table of forwarding node 125 is updated to indicate that data packets 155 are to be forwarded to forwarding node 130 using any applicable services.

In block 330, forwarding node 125 modifies control packet 150-1. For example, forwarding node 125 updates header information of control packet 150-1 to indicate a next network node of the route path. The modified version of control packet 150-1 is control packet 150-2. In this example, the next network node in the route path pictured is forwarding node 130. Forwarding node 125 communicates control packet 150-2 to forwarding node 130.

Responsive to receiving control packet 150-2, forwarding node 130 performs one or more operations. In block 335, forwarding node 130 updates a flow table stored in memory therein. The flow table stored within forwarding node 130 is updated with any instructions included in the route path of control packet 150-2 that indicate how forwarding node 130 is to process data packets 155 of the flow. For example, forwarding node 130 updates the internal flow table with instructions dictating that data packets 155 are to be forwarded to end node 135.

Forwarding node 120 sends data packets 155 of the flow subsequent to sending control packet 150-1 to forwarding node 125. While data packets 155 are shown to be sent from forwarding node 120 after control packets propagate to forwarding node 130, the ordering of communications shown is not intended to be limiting. Still, no data packet 155 of the flow is sent from forwarding node 120 until after the sending of control packet 150-1. For example, forwarding node 120 may send data packets 155 immediately after sending control packet 150-1. In another example, forwarding node 120 may send data packets 155 responsive to the passing of a predetermined amount of time after sending control packet 150-1.

Figure 4A:
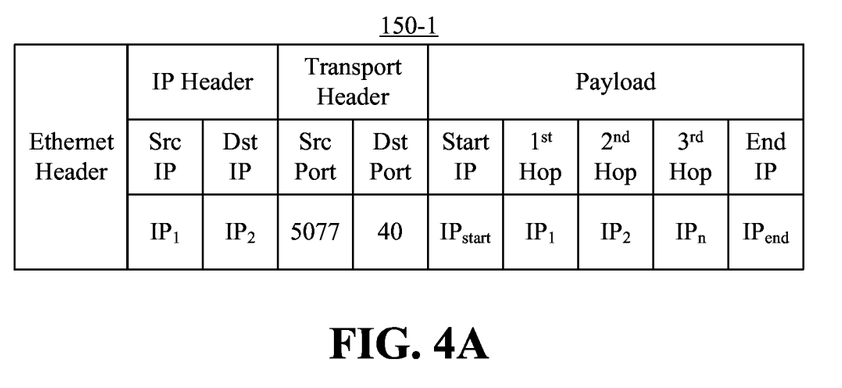
FIGS. 4A and 4B are block diagrams illustrating exemplary control packets.
Figure 4B:
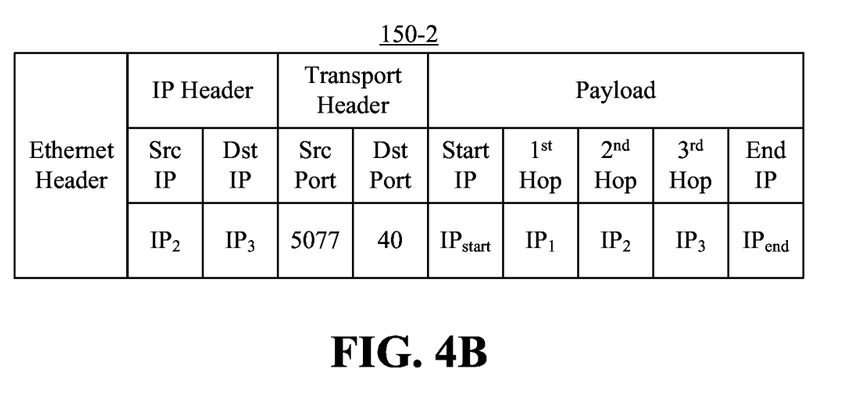

FIGS. 4A and 4B are block diagrams illustrating exemplary control packets. In the examples presented in FIGS. 4A and 4B, the control packets are implemented or formatted as User Datagram Protocol (UDP) packets. It should be appreciated that any of a variety of different packet formats and/or protocols may be used. UDP packets are only used for purposes of illustration and not limitation. Further, FIGS. 4A and 4B illustrate examples in which the route path is specified in the payload portion of each control packet. As noted, however, the payload portion may include data for the flow, instructions, and/or other attributes for the flow. Further, the route path may be specified by, or within, the control packet using encapsulation rather than being included within the payload portion of the control packet.

FIG. 4A is an exemplary illustration of control packet 150-1 as generated by forwarding node 120. Control packet 150-1 includes an Ethernet header portion, an IP header portion, a transport header portion, and a payload portion. The IP header portion specifies the source IP address (Src IP) of the network node from which control packet 150-1 is sent and the destination IP address (Dst IP) of the network node to which control packet 150-1 is sent. The source IP address for control packet 150-1 is the IP address of forwarding node 120 ($IP_1$). The destination IP address of control packet 150-1 is the IP address of forwarding node 125 ($IP_2$). The transport header specifies the source port and the destination port to be used. In this example, control packet 150-1 is identified by a unique UDP port number of 40. Payload portion of control packet 150-1 includes an ordered list of the network nodes forming the route path as determined by the SDN controller.

Forwarding node 125 examines the payload portion of control packet 150-1. Forwarding node 125 updates the flow table stored therein. As noted, forwarding node 125 searches for an entry in the flow table having a flow identifier matching the flow identifier of control packet 150-1. If forwarding node 125 locates a matching entry in the flow table, forwarding node 125 updates the entry with any instructions including the next network node in the route path that may be specified within control packet 150-1. If forwarding node 125 is unable to locate a matching entry in the flow table, forwarding node 125 creates an entry in the flow table for the flow. The instructions for the flow, as obtained from control packet 150-1, are stored in the flow table entry that is created.

Forwarding node 125 identifies the next node of the route path from the payload portion of control packet 150-1. Forwarding node 125 modifies control packet 150-1, thereby generating control packet 150-2 of FIG. 4B. As pictured in FIG. 4B, forwarding node 125 has updated the source IP address and the destination IP address of control packet 150-2. More particularly, forwarding node 120 has updated the source IP address to $IP_2$ and the destination IP address to $IP_3$, corresponding to forwarding node 125 and forwarding node 130, respectively. Forwarding node 125 sends control packet 150-2 to forwarding node 130.

Responsive to receiving control packet 150-2, forwarding node 130 examines the payload portion of control packet 150-2. Forwarding node 130 updates the flow table stored therein as previously described. Forwarding node 130 also identifies the next node of the route path from the payload portion of control packet 150-2. Forwarding node 130 determines that the next network node is end node 135. As such, forwarding node 130 does not modify and/or send control information to end node 135.

In the case where control packet 150-2 includes data within the payload portion, however, forwarding node 130 may generate a data packet having the data included therein which may be sent to end node 135. In another aspect, forwarding node 130 may update the IP header of control packet 150-2 and forward the modified version of control packet 150-2 to end node 135 so that end node 135 may extract the data.

Accordingly, with control packets traversing the route path as described, each forwarding node is configured with the appropriate instructions for handling data packets of the flow. Each such data packet will have a flow identifier that may be matched to the instructions stored within an entry in the flow table of each respective forwarding node.

Though not illustrated in FIG. 4, in another aspect, the payload of the control packet may include a hop counter data field. The hop counter data field may be used by a forwarding node to quickly determine the offset within the control packet and/or payload of the control packet to determine the next network node of the route path. Each forwarding node, as part of modifying the IP header information, would also update the hop counter data field prior to sending the modified control packet to the next network node.

In still another aspect, forwarding nodes may be configured to strip or remove any information from the control packet that was utilized by a prior forwarding node or a prior network node. In that case, each forwarding node would remove those network nodes, or hops, from the payload portion of the control packet that were visited. As such, upon receipt of a control packet, each forwarding node need only check a same, fixed location within the packet to determine the next network node of the route path. For example, control packet 150-3, being sent from forwarding node 125 to forwarding node 130, would have a payload with only end node 135 specified for the route path since each other network node was traversed.

In some cases, the flow policy propagation techniques described within this disclosure may be augmented to accommodate network nodes having the capability to change the route path of the flow referred to as a "decision making network node." A firewall is an example of a decision making network node. A firewall, for example, may decide that a certain flow and/or packet of a flow should be forwarded through an intrusion detection system, blocked, or otherwise diverted from the route path. In such cases, the SDN controller may determine a conservative route path that avoids the decision making network node or provide a route path up to, and ending at, the decision making network node. In each case, forwarding nodes up to the decision making network node are updated. The decision making network node may modify the route path specified within the existing control packet that is received or request a remaining portion of a path from the SDN controller, where the remaining portion of the route path is from the decision making network node to the end node.

The example provided above for a decision making network node is applicable to situations where the decision making network node makes decisions based upon n-tuple information of the control packet, where "n" is an integer value, e.g., 5. In cases where the decision making network node is able to inspect the payload of the control packet, the decision making network node also must be able to read and/or access header information for the packet. In such cases, the control packet may be augmented so that header information of the control packet is also included or incorporated into the payload portion of the control packet and, thereby available for inspection from a decision making network node configured to inspect payloads.

Figure 5:
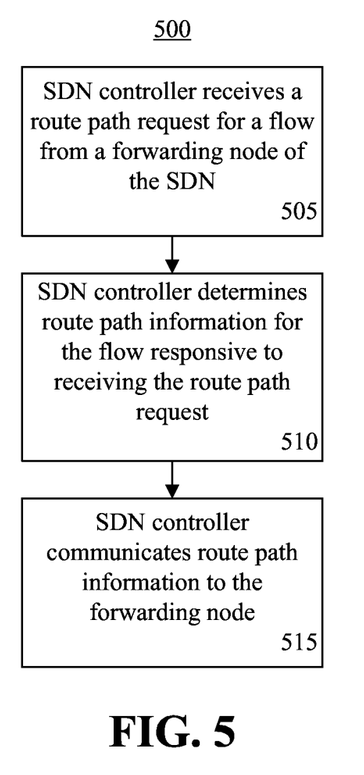
FIG. 5 is a flow chart illustrating an exemplary method of propagating a flow policy within an SDN.

FIG. 5 is a flow chart illustrating an exemplary method 500 of propagating a flow policy in an SDN. Method 500 may be implemented by the SDN controller as described within this disclosure. In block 505, the SDN controller receives a route path request for a flow from a forwarding node of the SDN. The forwarding node from which the route path request is received may be a first forwarding node, or one connected to a client that is initiating a flow to another client. The route path request may specify the start node and the end node for the flow. In another aspect, the route path request may specify one or more requested services to be applied or used for the flow.

In block 510, responsive to the route path request, the SDN controller determines route path information for the flow. The route path information may specify the start node, the end node, and one or more forwarding nodes. The route path information further may specify information to be used by the forwarding nodes in processing the flow such as one or more services to be applied to packets of the flow and/or instructions for handling packets of the flow. The route path information may specify the aforementioned data on a per-forwarding node basis.

In block 515, the SDN controller communicates the route path information to the forwarding node. The route path information is communicated only to the forwarding node that issued the route path request. The route path information is not sent from the SDN controller directly to any other forwarding node of the route path. Rather, the route path information propagates as one or more control packets from one forwarding node to the next in accordance with the ordered list of forwarding nodes specified therein.

Figure 6:
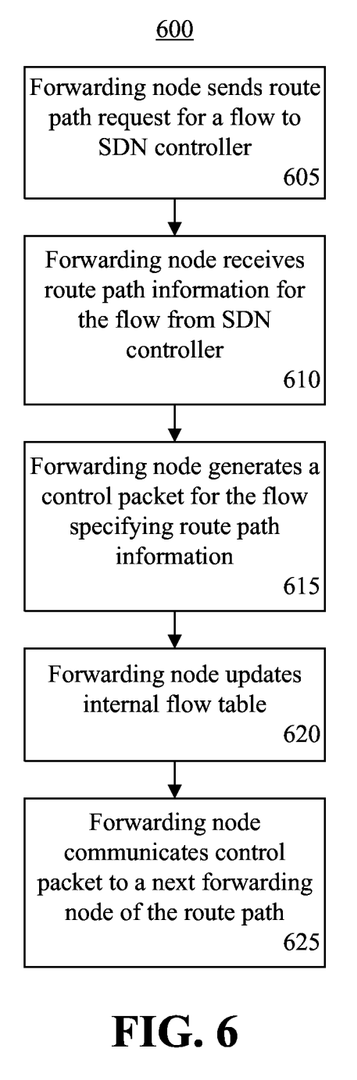
FIG. 6 is a flow chart illustrating another exemplary method of propagating a flow policy within an SDN.

FIG. 6 is a flow chart illustrating another exemplary method 600 of propagating a flow policy in an SDN. Method 600 may be implemented by a forwarding node as described within this disclosure. In block 605, the forwarding node sends a route path request for a flow to the SDN controller of an SDN. As noted, the forwarding node may send the route path request responsive to a client initiating a flow. In block 610, the forwarding node receives route path information for the flow from the SDN controller. In block 615, the forwarding node generates a control packet specifying the route path. In another aspect, one or more items or the entirety of the route path information is included or specified by the control packet generated by the forwarding node.

In block 620, the forwarding node updates an internally stored flow table. The flow table is used to store entries indicating how to process different flows. For example, each entry corresponds to one flow that his being handled or processed by the forwarding node. Responsive to receiving the route path information, the forwarding node determines the flow identifier from the received route path information. The forwarding node determines whether the internally stored flow table includes an entry having a flow identifier matching the flow identifier determined from the received route path information. If so, the matching entry is updated in accordance with the route path information for the forwarding node. If not, an entry is created specifying route path information for the forwarding node.

In block 625, the forwarding node communicates the control packet to the next, e.g., or second, forwarding node in the route path. As discussed, responsive to receiving the control packet, the second forwarding node updates the internally stored flow table. If a third forwarding node beyond the second forwarding node is specified by the route path information, the second forwarding node modifies the control packet for sending to the third forwarding node. Forwarding nodes continue to update internal tables and communicate a control packet to the next forwarding node until the last forwarding node of the route path is reached. After updating the flow table in each forwarding node as described herein, each forwarding node of the route path is configured to forward data packets from one endpoint of the flow to the other.

The inventive arrangements disclosed within this specification provide flow policy propagation techniques in which the flow table entries of the forwarding nodes along the route path of the flow are updated prior any of the forwarding nodes receiving data packets of the flow for processing. As such, per-flow consistency is guaranteed and out of order data packets for the flow are avoided. In addition, the control plane load is reduced since flow table entries are sent over the data plane as opposed to the control plane of the SDN. Further, the flow policy propagation technique(s) described within this disclosure guarantee that only necessary flow table entries are created in the forwarding nodes along the route path of the flow that is computed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise. The term "if" may be construed to mean "when," "upon," "in response to [a stated condition or operation]," or "responsive to [a stated condition or operation]" depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, from a first forwarding node of a software defined network, a route path request for a flow;
   responsive to the route path request, determining route path information specifying a route path for the flow using a processor of a software defined network controller; and
   communicating the route path information from the software defined network controller only to the first forwarding node,
   wherein the route path information is adapted to be used by the first forwarding node to generate a control packet comprising the route path, the control packet to be communicated to a second forwarding node of the route path;
   wherein the second forwarding node comprises a flow table and, responsive to receiving the control packet, the second forwarding node updates the flow table according to the control packet, and
   wherein the second forwarding node modifies the control packet for sending to a third forwarding node of the route path and sends the control packet to the third forwarding node.

2. The method of claim 1, wherein the route path request specifies a start node and an end node.

3. The method of claim 1, wherein the route path information further specifies a service to be applied to the flow.

4. The method of claim 1, wherein the control packet is communicated from the first forwarding node to the second forwarding node using a data plane of the software defined network without intervention from the software defined network controller.

5. The method of claim 4, wherein the first forwarding node sends the control packet to the second forwarding node prior to communicating any other packet of the flow to the second forwarding node.

6. A method, comprising:
   sending a route path request for a flow from a first forwarding node to a software defined network controller of a software defined network;
   receiving route path information specifying a route path for the flow from the software defined network controller;
   generating, using a processor of the first forwarding node, a control packet comprising the route path; and
   communicating the control packet from the first forwarding node to a second forwarding node;
   wherein the second forwarding node comprises a flow table and, responsive to receiving the control packet, the second forwarding node updates the flow table according to the control packet, and
   wherein the second forwarding node modifies the control packet for sending to a third forwarding node of the route path and sends the control packet to the third forwarding node.

7. The method of claim 6, wherein the control packet is communicated from the first forwarding node to the second forwarding node over a data plane of the software defined network without intervention from the software defined network controller.

8. The method of claim 6, wherein the control packet is sent from the first forwarding node to the second forwarding node prior to communicating any other packet of the flow to the second forwarding node.

9. The method of claim 6, wherein the first forwarding node comprises a flow table and, responsive to receiving the route path information, updates the flow table; and
   wherein the first forwarding node processes a data packet of the flow according to the updated flow table.

10. A system, comprising:
    a processor programmed to initiate executable operations comprising:
    sending a route path request for a flow from a first forwarding node to a software defined network controller of a software defined network;
    receiving route path information specifying a route path for the flow from the software defined network controller;
    generating a control packet comprising the route path; and
    communicating the control packet from the first forwarding node to a second forwarding node;

wherein the second forwarding node comprises a flow table and, responsive to receiving the control packet, the second forwarding node updates the flow table according to the control packet, and wherein the second forwarding node modifies the control packet for sending to a third forwarding node of the route path and sends the control packet to the third forwarding node.

11. The system of claim 10, wherein the control packet is communicated from the first forwarding node to the second forwarding node over a data plane of the software defined network without intervention from the software defined network controller.

12. The system of claim 10, wherein the control packet is sent from the first forwarding node to the second forwarding node prior to communicating any other packet of the flow to the second forwarding node.

13. The system of claim 10, wherein the first forwarding node comprises a flow table and, responsive to receiving the route path information, updates the flow table; and wherein the first forwarding node processes a data packet of the flow according to the updated flow table.

14. A non-transitory computer program product comprising a computer readable storage medium having program code stored thereon, the program code executable by a processor to perform a method comprising:

sending a route path request for a flow from a first forwarding node to a software defined network controller of a software defined network using a processor of the first forwarding node;

receiving route path information specifying a route path for the flow from the software defined network controller using the processor of the first forwarding node;

generating a control packet comprising the route path using the processor of the first forwarding node; and communicating the control packet from the first forwarding node to a second forwarding node using the processor of the first forwarding node;

wherein the second forwarding node comprises a flow table and, responsive to receiving the control packet, the second forwarding node updates the flow table according to the control packet, and wherein the second forwarding node modifies the control packet for sending to a third forwarding node of the route path and sends the control packet to the third forwarding node.

15. The computer program product of claim 14, wherein the control packet is communicated from the first forwarding node to the second forwarding node over a data plane of the software defined network without intervention from the software defined network controller.

16. The computer program product of claim 14, wherein the control packet is sent from the first forwarding node to the second forwarding node prior to communicating any other packet of the flow to the second forwarding node.

17. The computer program product of claim 14, wherein the first forwarding node comprises a flow table and, responsive to receiving the route path information, updates the flow table; and wherein the first forwarding node processes a data packet of the flow according to the updated flow table.

* * * * *